March 3, 1970  D. K. RAY-CHAUDHURI ET AL  3,498,958
WATER-AND OIL REPELLENCY AGENTS
Filed June 27, 1968
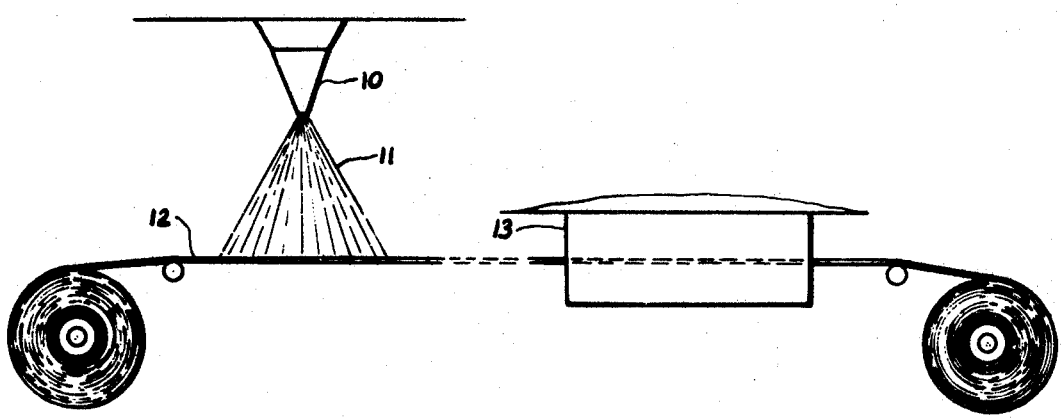
INVENTORS
DILIP K. RAY-CHAUDHURI
CARMINE P. IOVINE
BY
ATTORNEY

United States Patent Office 3,498,958
Patented Mar. 3, 1970

3,498,958
WATER- AND OIL REPELLENCY AGENTS
Dilip K. Ray-Chaudhuri, Somerset, and Carmine P. Iovine, North Plainfield, N.J., assignors to National Starch and Chemical Corporation, New York, N.Y., a corporation of Delaware
Filed June 27, 1968, Ser. No. 740,633
Int. Cl. C08f *29/38, 37/00*
U.S. Cl. 260—78.5                     12 Claims

ABSTRACT OF THE DISCLOSURE

Fluoroalkyl amidoalkyl acrylates and methacrylates comprising the reaction product of a fluoro carboxylic acid, an alkanol amine and an acrylic or methacrylic acid reagent. The resulting monomers may, thereafter, by homo- or copolymerized with a wide variety of conventional ethylenically unsaturated, i.e. vinyl, monomers, said polymeric materials imparting both water and oil repellency to a wide variety of substrates.

SUMMARY OF THE INVENTION

It is the object of this invention to provide a novel class of fluoroalkyl amidoalkyl acrylate and methacrylate esters, said esters being capable of undergoing vinyl type polymerizations either alone or in the presence of other vinyl type monomers. A further object of this invention is to utilize these compositions to treat substrates exhibiting either fibrous, porous or continuous surfaces and thereby provide said substrates with a high degree of water, oil and soil repellency. Various other objects and advantages of this invention will become apparent to the practitioner from the following description thereof.

Thus, the novel monomeric compositions of this invention comprise the fluoroalkyl amidoalkyl acrylate and methacrylate esters corresponding to the following formula:

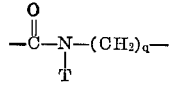

wherein:

Z is a radical containing from 3 to 20 carbon atoms inclusive and is elected from the group consisting of straight and branched chain perfluoro alkyl radicals; perfluoro cyclo aliphatic radicals; perfluoro polycyclo aliphatic radicals; and, straight and branched chain perfluoro alkyl, perfluoro cyclo aliphatic and perfluoro polycyclo aliphatic radicals wherein the perfluoro group is substituted with at least one atom selected from the group consisting of hydrogen, chlorine, bromine and iodine atoms;

X is a radical selected from the group consisting of straight chain alkylene radicals corresponding to the formula $(CH_2)_p$ wherein $p$ is an integer having a value from 1 to 14 inclusive, cycloaliphatic radicals, bridged cycloaliphatic radicals;

—CH=CH—$(CH_2)_b$—O—$(CH_2)_2$— radicals wherein $b$ is an integer having a value of from 0 to 14 inclusive,

—$CH_2$—$CH_2$—$(CH_2)_b$—O—$(CH_2)_2$— radicals wherein $b$ is an integer having a value of from 0 to 14 inclusive, —CH=CH—$(CH_2)_b$—S—$(CH_2)_2$— radicals wherein $b$ is an integer having a value of from 0 to 14 inclusive, —$CH_2$—$CH_2$—$(CH_2)_b$—S—$(CH_2)_2$— radicals wherein $b$ is an integer having a value of from 0 to 14 inclusive, and

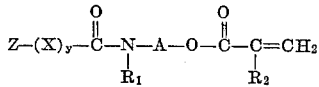

radicals wherein T is a radical selected from the group consisting of hydrogen radicals and alkyl radicals containing from 1 to 6 carbon atoms and $q$ is an integer having a value of from 1 to 18 inclusive;

$y$ is an integer having a value of from 0 to 1 inclusive;

A is a radical selected from the group consisting of straight and branched chain alkylene radicals corresponding to the formula $(CH_2)_m$ wherein $m$ is an integer having a value of from 2 to 14 inclusive, cycloaliphatic radicals, bridged cycloaliphatic radicals, aralkyl radicals and aromatic radicals;

$R_1$ is a radical selected from the group consisting of hydrogen radicals and alkyl radicals containing from 1 to 6 carbon atoms; and, $R_2$ is a radical selected from the group consisting of hydrogen and methyl radicals.

As previously noted, materials which have been treated with the novel fluoro compositions of this invention exhibit water, oil and soil repellency. Among the primary advantages derived from the use of these additives are included:

(1) the ability to use a single additive in order to acquire a large number of desired properties;

(2) the applicability of these additives to a wide variety of substrates, e.g. textiles, paper, etc.;

(3) the prolonged retention of the properties imparted by these novel additives despite repeated wet laundering and/or dry cleaning;

(4) the ease with which substrates may be treated with these additives; and, (5) the soft hand and drape which is also imparted to the thus treated fabrics, etc.

DESCRIPTION OF THE PREFERRED EMBODIMENTS

In brief, the procedure for preparing the fluoroalkyl amidoalkyl acrylate and methacrylate esters of this invention comprises reacting:

(1) a fluoro carboxylic acid with (2) an alkanol amine, and, thereafter, reacting the resulting fluoro amide-alkanol intermediate with an acrylic or methacrylic acid reagent.

The fluoro carboxylic acids applicable for use in the process of this invention correspond to the formula:

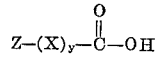

wherein:

Z is a radical containing from 3 to 20 carbon atoms inclusive and is selected from the group consisting of straight and branched chain perfluoro alkyl radicals; perfluoro cyclo aliphatic radicals; perfluoro polycyclo aliphatic radicals; and, straight and branched chain perfluoro alkyl, perfluoro cyclo aliphatic and perfluoro polycyclo aliphatic radicals wherein the perfluoro group is substituted with at least one atom selected from the group consisting of hydrogen, chlorine, bromine and iodine atoms;

X is a radical selected from the group consisting of straight chain alkylene radicals corresponding to the formula $(CH_2)_p$ wherein $p$ is an integer having a value of from 1 to 14 inclusive, cycloaliphatic radicals, bridge cycloaliphatic radicals, —CH=CH—$(CH_2)_b$—O—$(CH_2)_2$— radicals wherein $b$ is an integer having a value of from 0 to 14 inclusive, $$-CH_2-CH_2-(CH_2)_b-O-(CH_2)_2-$$

radicals wherein $b$ is an integer having a value of from 0 to 14 inclusive, $$-CH=CH-(CH_2)_b-S-(CH_2)_2-$$

radicals wherein $b$ is an integer having a value of from 0 to 14 inclusive, $$-CH_2-CH_2-(CH_2)_b-S-(CH_2)_2-$$

radicals wherein $b$ is an integer having a value of from 0 to 14 inclusive, and $$-\overset{O}{\underset{\underset{T}{|}}{C}}-N-(CH_2)_q-$$

radicals where in T is a
radical selected from the group consisting of hydrogen radicals and alkyl radicals containing from 1 to 6 carbon atoms and $q$ is an integer having a value of from 1 to 18 inclusive; and, $y$ is an integer having a value of from 0 to 1 inclusive.

Thus, among the applicable fluoro carboxylic acids are included: Perfluoro butanoic acid, i.e. $C_3F_7COOH$; perfluoro octanoic acid, i.e. $C_7F_{15}COOH$; omega-perfluoroheptyl pentanoic acid, i.e. $C_7F_{15}(CH_2)_4COOH$; omega-perfluoroheptyl undecanoic acid, i.e.

$$C_7F_{15}(CH_2)_{10}COOH$$

perfluoroheptyl methyl cyclobutane carboxylic acid; perfluoroheptyl substituted norbornene carboxylic acid; omega-perfluoroheptyl-beta-allyloxy - propionic acid, i.e.

$$C_7F_{15}-CH=CH-CH_2-O-(CH_2)_2-COOH$$

omega-perfluoroheptyl-beta - propoxypropionic acid, i.e.

$$C_7F_{15}-(CH_2)_3-O-(CH_2)_2-COOH$$

omega-perfluoroheptyl-beta - allylthiopropionic acid, i.e.

$$C_7F_{15}-CH=CH-CH_2-S-(CH_2)_2-COOH$$

omega-perfluoroheptyl-beta - propylthiopropionic acid, i.e.

$$C_7F_{15}-(CH_2)_3-S-(CH_2)_2-COOH$$

omega-(N-methyl)-perfluoro - heptanecarboxamido hendecanoic acid, i.e.

$$C_7F_{15}-\overset{O}{\underset{\underset{CH_3}{|}}{C}}-N-(CH_2)_{10}-COOH$$

octafluoro, octachloro nonanoic acid, i.e.

$$H(CF_2-CCl_2)_4COOH$$

and, perfluoro bicyclo (4.2.0)-3H-4-octanoic acid.

The alkanol amines applicable for use in the process of this invention correspond to the formula $$\underset{\underset{R_1}{|}}{NH}-A-OH$$

wherein A and $R_1$ are as previously described. Thus, among the applicable alkanol amines are included: Ethanol amine, 1,3 propanol amine, 1,4 butanol amine, 2-amino-3-hydroxy norbornane, 2-amino cyclohexanol, N-ethyl ethanol amine, isopropanol amine, and para-amino phenyl ethanol.

A typical procedure for preparing the fluoroalkyl amido-alkanol intermediates comprises slowly admixing preferably in an inert atmosphere such as under nitrogen gas, the fluoro carboxylic acid and the alkanol amine in stoichiometric proportions and thereafter heating the resulting mixture at a temperature of from about 40° C. to 250° C. for a period of about ½ to 3 hours, while simultaneously distilling off the water that is formed during the course of the reaction. It should be noted that variations in temperature and pressure may be used in order to either increase or decrease the duration of the reaction period. Aspiration may be applied to the reaction system in order to insure completion of the reaction.

It should be noted that the fluoroalkyl amido-alkanol intermediates can also be prepared by means of:

(1) An ester-amide interchange reaction wherein an ester of one of the previously described fluoro carboxylic acids, e.g. methyl perfluorooctanoate and ethyl(omega-perfluoroheptyl)propionate, is reacted with the alkanol amine; and, (2) An acylation reaction wherein the alkanol amine is reacted with an acid halide of one of the previously described fluoro carboxylic acids.

The procedures which may be used for preparing the acrylate and methacrylate esters of the fluoroalkyl amido-alkanol intermediates are well known to those skilled in the art. Included among such procedures are:

(1) Direct esterification wherein glacial acrylic or methacrylic acid is reacted with the alkanol intermediate, the latter esterification being effected by refluxing the reagents in the presence of an acidic catalyst, such as benzene sulfonic acid, and removing the water formed during the course of the reaction by means of an azeotropic distillation technique;

(2) The reaction, at temperatures of from about 80° C. to 200° C. of the amido-alkanol intermediate with acrylyl or methacrylyl chloride and the simultaneous removal of the hydrogen chloride produced during the course of the reaction; and (3) An alcoholysis technique whereby a low molecular weight acrylate or methacrylate ester such, for example, as methyl acrylate, ethyl acrylate and methyl methacrylate is reacted with the amido-alkanol intermediate in either an acidic or alkaline medium at temperature of from about 80° C. to 150° C. Regardless of the procedure utilized, the resulting acrylate and methacrylate esters may be purified by conventional means thereby resulting in products which are usually low melting solids or viscous liquids, which are highly soluble in chlorinated solvents, alcohols and acetone and which have some utility as water and oil repellency agents. In view of the variety of methods which may be used to prepare the acrylate and methacrylate esters, the term "acrylic and methacrylic acid reagent," for purposes of this invention, is meant to include acrylic acid, methacrylic acid and any derivatives thereof which may be utilized to convert the amido-alkanol intermediate to its acrylate or methacrylate equivalent.

With respect to proportions, the determination of the precise concentration of the primary reactants in relation to one another, as based on the stoichiometric equivalencies of the various reactions, is left to the discretion of the practitioner. However, typical proportions for the preparation of the intermediates and the subsequent acrylates and methacrylates include the reaction of one mole of the fluoro carboxylic acid with approximately one mole of the alkanol amine and, thereafter, the reaction of the intermediate product with approximately one mole of the acrylic or methacrylic acid reagent.

In utilizing the fluoroalkyl amidoalkyl acrylates and methacrylates in the preparation of homo- and copolymers, there may be employed one of the usual vinyl polymerization methods which are well known to those skilled in the art and which is particularly suited for the homo- and copolymer whose preparation is desired. Thus, such polymers may be prepared by means of free radical initiated processes utilizing bulk, suspension, solution or emulsion polymerization techniques; or, they may be prepared by ionic catalysis or by means of stereospecific catalysts such as those of the type developed by Ziegler.

The comonomers which may be utilized together with the above described acrylate and methacrylate monomers for the preparation of the copolymers of this invention can be any ethylenically unsaturated monomer such, for example, as styrene; alpha-methyl styrene; the acrylic, methacrylic and crotonic acid esters of aliphatic alcohols such as methyl, ethyl, propyl, butyl, isobutyl, amyl, hexyl, 2-ethyl hexyl, octyl, lauryl and stearyl alcohols; acrylic acid; methacrylic acid; crotonic acid; isoprene; acrylamide; methacrylamide; N-methylol acrylamide; acrylonitrile; methacrylonitrile; butadiene; vinyl propionate; dibutyl fumarate; dibutyl maleate; diallyl phthalate; vinylidene chloride; vinyl chloride; vinyl fluoride; vinyl acetate; ethylene; and, propylene, etc. Any of these monomers may be used either alone or in combination with one another together with one or more of the acrylate and methacrylate monomers of this invention.

The homo- and copolymers of this invention, whether prepared by means of bulk, suspension, solution or emulsion polymerization techniques or by any other means, may all be effectively utilized to treat a virtually unlimited variety of solid materials regardless of whether they exhibit fibrous, porous or continuous surfaces. Among such materials are included: Textiles derived from wool, cotton, polyester, nylon, polyacrylonitrile and other synthetic fibers; glass; paper; wood; leather; fur; asbestos; brick; concrete; metal; ceramics; plastics as well as painted and plastered surfaces. Thus, for purposes of convenience, when reference is hereinafter made to "applying to" or to "treating" or to "the treatment of" such substrates, these terms are meant to encompass both the coating and/or impregnation of porous substrates as well as the coating of impervious substrates.

These solid materials may be treated by means of any effective technique whose use is desired by the practitioner. Thus, textiles are typically treated by a "padding" technique wherein the textile is passed through an organic solvent solution of a novel fluorochemical product of this invention, squeezed through a nip and then briefly heated to evaporate the solvent. Typical organic solvents include isopropanol, acetone, methyl ethyl ketone, etc. The treated textile is subsequently cured by being heated at a temperature of from about 60° C. to 180° C. for a period of about 5 to 10 minutes, thereby developing total water and oil repellency. A Lewis acid catalyst, such as aluminum chloride, may be optionally present in order to enhance the latter curing operation. In addition, such surface coating techniques as spraying and brushing may also be effectively utilized in order to deposit a film of the repellent on the surface of the substrate. The amount of additive which is required to provide adequate water, oil and soil repellency will vary according to the particular fluorochemical product being used, the selected substrate and the specific end-use application of the resulting treated product, although the presence of as little as about 0.1% of the additive, based on the weight of the substrate, will ordinarily provide adequately improved water and oil repellency. On the other hand, it may be noted that there is no particular advantage to be derived from utilizing more than about 6% of repellent, based on the weight of the substrate, since the increased expense thus incurred far outweighs the increase in repellency which may be obtained thereby.

In addition, it is to be noted that the novel polymers of this invention may be applied to the desired substrates while they are in the form of an aqueous emulsion, it being merely necessary to polymerize them in aqueous emulsion form, or, otherwise, to select an appropriate emulsifier for the polymeric system.

The actual application to substrates of the novel compositions of this invention may be accomplished by any means capable of effectively depositing a small concentration of the repellent.

The drawing illustrates a spray technique wherein, nozzle 10 sprays solution 11 of repellent onto substrate 12 which passes through drier 13 to remove the solvent.

The following examples will further illustrate the embodiment of this invention. In these examples, all parts given are by weight unless otherwise noted.

Example I

This example illustrates the preparation of a fluoroalkyl amidoalkyl acrylate monomer typical of the novel products of this invention.

A reaction vessel fitted with a nitrogen inlet, a distillation apparatus and means for mechanical agitation was charged with 10.7 parts of omega-perfluoroheptyl propanoic acid and 8 parts of methyl alcohol and then heated to a temperature of 40° C. A moderate stream of nitrogen was passed over the mixture whereupon 2.4 parts of 1,4 butanol amine were added thereto. The temperature of the reaction system was raised to 160° C. over a period of 30 minutes and the reaction allowed to proceed at this temperature for an additional three hours. The methanol as well as the water which formed during the source of the reaction were continuously distilled from the system. Upon evacuating the system in order to remove any residual 1,4 butanol amine, the fluoroalkyl amido-alkanol intermediate, i.e. the 4-(omega-perfluoroheptyl propanamido)butan-1-ol, was recovered in the form of a tan solid having a melting point of 60 to 64° C.

Thereafter, 11 parts of the above prepared intermediate product were admixed with 2.3 parts of glacial acrylic acid, 0.1 part of hydroquinone, 0.1 part of benzene sulfonic acid and 18 parts of toluene; the resulting mixture being charged into a reaction vessel fitted with an azeotropic distillation receiver and condenser and means for mechanical agitation. The mixture was agitated and heated at its reflux temperature, i.e. 110° C., thereby separating the toluene-water azeotrope. This procedure was continued for a period of 18 hours at which time it was determined that 85% of the theoretical amount of water was collected. The toluene and excess acrylic acid in the system were removed in vacuo and the viscous residue dissolved in chloroform and then washed in water and aqueous sodium bicarbonate solution. The chloroform solution was dried and the solvent removed thereby providing the 4-(omega-perfluoroheptyl)propanamido-1-butyl acrylate as a solid with a paste-like consistency.

The above procedure was then repeated, under identical conditions, with the exception that methacrylic acid was substituted for the acrylic acid utilized therein in order to prepare a comparable methacrylate ester.

Example II

This example illustrates the preparation of the novel polymers of this invention by means of a solution polymerization technique.

Thus, a reaction vessel fitted with a reflux condenser and means for mechanical agitation was charged with 5 parts of the acrylate monomer prepared in Example I, hereinabove, 1 part of ethyl acrylate, 0.015 part of azobisisobutyro nitrile and 6 parts of isopropyl alcohol. A stream of nitrogen was passed over the system whereupon the mixture was heated to a temperature of 65 to 70° C. An additional 0.015 part of azobisisobutyronitrile was added to system after heating had proceeded for eight hours, whereupon the polymerization reaction was completed by continued heating for an additional 14 hours.

This solution polymerization technique is suitable for preparing any of the fluoro carboxylic reaction products in accordance with the invention. Thus, following the procedure of the Example II, the following ethylenically unsaturated monomers may be used: Styrene, alpha-methyl styrene, the acrylic, methacrylic and crotonic esters of aliphatic alcohols, acrylic acid, methacrylic acid, crotonic acid, isoprene, acrylamide, methacrylamide, N-methylol acrylamide, acrylonitrile, methacrylonitrile, butadiene, vinyl propionate, dibutyl fumarate, dibutyl maleate, diallyl phthalate, vinylidene chloride, vinyl chloride, vinyl fluoride, vinyl acetate, ethylene and propylene.

Example III

This example illustrates the wide variety of reagents and reaction conditions which can be efficiently utilized to prepare the novel products of this invention.

A number of different fluoro acrylate copolymers were prepared, according to the general procedure set forth in Examples I and II, utilizing a variety of reagents at different concentration levels and under varying reaction conditions. These variables are presented in the following tables wherein "Table I" refers to the preparation of the fluoroalkyl amido-alkanol intermediates, "Table II" refers to the preparation of the corresponding acrylate esters and "Table III" refers to the copolymerization of the resulting acrylate ester monomers.

been treated with the novel fluoro acrylate copolymers of this invention.

In order to demonstrate the excellent water and oil repellent characteristics of the novel copolymers of this invention, the following testing procedures were employed. In each instance, the cotton print cloth that was used as the textile sample was treated by means of a padding technique wherein the sample was passed through a 1:1 isopropanol:methyl ethyl ketone solution of the selected copolymer, squeezed through a nip, heated at a low temperature in order to evaporate the solvent and thereafter heated at a temperature of 150° C. for a period of 5 minutes in order to cure the thus treated fabric.

*Oil repellency.*—The oil repellency of the treated cotton fabrics was measured by use of the "3M Oil Repel-

TABLE I

| | Parts—Intermediate No. | | | | | | | |
|---|---|---|---|---|---|---|---|---|
| | 1 | 2 | 3 | 4 | 5 | 6 | 7 | 8 |
| Perfluoro octanoic acid | | 41.4 | 100.0 | | | | 100.0 | |
| Omega-perfluoroheptyl propanoic acid | | | | | | 20.0 | | |
| Omega-perfluoroheptyl pentanoic acid | | | | 21.0 | | | | 18.8 |
| Omega-perfluoroheptyl undecanoic acid | 34.0 | | | | 18.0 | | | |
| Ethanol amine | | | | | | | 16.0 | 2.5 |
| N-ethyl ethanol amine | | | 23.3 | 4.3 | 3.1 | 4.4 | | |
| 1,4 butanol amine | 6.0 | 8.9 | | | | | | |
| Methanol | 8.0 | 15.0 | 15.0 | 8.0 | 8.0 | 8.0 | 15.0 | 15.0 |
| Reaction temperature (° C.) | 175 | 150 | 165 | 160 | 160 | 170 | 175 | 175 |
| Total reaction time (hours) | 2 | 2 | 2 | 1.5 | 1.5 | 1 | 2 | 2 |
| Melting point of intermediate (° C.) | 77–79 | 51–55 | 42–47 | 48–52 | 54–58 | 44–47 | 60–62 | 63–66 |

TABLE II

| | Parts—Monomer No. | | | | | | | |
|---|---|---|---|---|---|---|---|---|
| | 11 | 12 | 13 | 14 | 15 | 16 | 17 | 18 |
| 4-(omega-perfluoroheptyl undecanamido) butan-1-ol (intermediate #1) | 35.0 | | | | | | | |
| 4-(perfluoro octanamido) butan-1-ol (intermediate #2) | | 40.0 | | | | | | |
| 2-(N-ethyl perfluoro octanamido)ethan-1-ol (intermediate #3) | | | 50.0 | | | | | |
| 2-(N-ethyl-omega-perfluoroheptyl pentanamido) ethan-1-ol (intermediate #4) | | | | 22.0 | | | | |
| 2-(N-ethyl-omega-perfluoroheptyl undecanamido) ethan-1-ol (intermediate #5) | | | | | 18.0 | | | |
| 2-(N-ethyl-omega-perfluoropeptyl propanamido) ethan-1-ol (intermediate #6) | | | | | | 20.0 | | |
| 2-(perfluoro octanamido)ethan-1-ol (intermediate #7) | | | | | | | 20.0 | |
| 2-(omega-perfluoroheptyl pentanamido)ethan-1-ol (intermediate #8) | | | | | | | | 20.5 |
| Glacial acrylic acid | 7.2 | 13.0 | 14.5 | 7.2 | 5.0 | 7.2 | | 8.6 |
| Acrylyl chloride | | | | | | | 3.9 | |
| Toluene | 43.5 | 43.5 | 67.0 | 30.0 | 30.0 | 22.0 | | 43.5 |
| Dichloroethane | | | | | | | 20.0 | |
| Benzene sulfonic acid | 0.4 | 0.6 | 0.6 | 0.3 | 0.3 | 0.3 | | 0.5 |
| Hydroquinone | 0.4 | 0.6 | 0.3 | 0.2 | 0.2 | 0.2 | 0.2 | 0.3 |
| Reaction temperature (° C.) | 110 | 110 | 110 | 110 | 110 | 110 | 80 | 110 |
| Total reaction time (hours) | 23 | 24 | 24 | 18 | 18 | 22 | 40 | 40 |
| Melting point of monomer (° C) | 32–34 | (¹) | (¹) | (¹) | (¹) | 22–25 | 28–33 | |
| Boiling point of monomer (° C. at mm. Hg) | | | | 180–190 | 250–280 | 160–170 | 125–140 | |

¹ Viscous liquid.

TABLE III

| | Parts—Polymer No. | | | | | | | |
|---|---|---|---|---|---|---|---|---|
| | 21 | 22 | 23 | 24 | 25 | 26 | 27 | 28 |
| 4-(omega-perfluoroheptyl undecanamido)-1-butyl acrylate (monomer #11) | 6.0 | | | | | | | |
| 2-(N-ethyl-omega-perfluoroheptyl undecanamido)-1-ethyl acrylate (monomer #15) | | 6.3 | | | | | | |
| 2-(N-ethyl-omega-perfluoroheptyl pentanamido)-1-ethyl acrylate (monomer #14) | | | 5.4 | | | | | |
| 2-(N-ethyl-omega-perfluoroheptyl propanamido)-1-ethyl acrylate (monomer #16) | | | | 9.0 | | | | |
| 2-(perfluoro octanamido)-1-ethyl acrylate (monomer #17) | | | | | 7.4 | 10.0 | 6.0 | 6.0 |
| Ethyl acrylate | | 1.0 | 1.0 | 1.6 | 1.5 | 1.9 | | |
| Stearyl acrylate | | | | | | | | 3.8 |
| 2-ethyl hexyl acrylate | | | | | | | 2.2 | |
| N-methylol acrylamide | 0.2 | | | | | 0.2 | | 0.3 |
| Isopropyl alcohol | 19.0 | 7.0 | 6.0 | 10.0 | 9.0 | 12.0 | 8.0 | 15.0 |
| Azobisisobutyronitrile | 0.1 | 0.02 | 0.02 | 0.05 | 0.009 | 0.06 | 0.04 | 0.05 |
| Reaction temperature (° C.) | 55–60 | 70 | 70 | 66–70 | 66 | 65–70 | 65–70 | 60–65 |
| Total reaction time (hours) | 24 | 18 | 18 | 21 | 5 | 22 | 20 | 20 |
| Conversion to polymer (percent) | 90 | 88.5 | 96 | 87.7 | 82.5 | 86.8 | 93 | 86 |

The data presented hereinabove clearly indicate the effectiveness of the process of this invention in the utilization of a wide range of reagents and reaction conditions.

Example IV

This example illustrates the excellent water and oil repellent properties exhibited by substrates which have lency Test"; the latter procedure being fully described on page 323 of the April 1962 issue of the Textile Research Journal. In this procedure, an 8" x 10" swatch of the treated cotton, which had been conditioned at a temperature of 70° F. (21° C.) and a relative humidity of 65% for a period of 4 hours, was securely fastened to a 5" hoop in order to provide a smooth wrinkle-free surface.

Single drops of testing oils, which comprised varying mixtures of mineral oil and n-heptane were gently placed upon the fabric and after a three minute period, the fabric was visually studied in order to observe the extent of wetting and penetration. An oil repellency rating, as defined in the following table, was then assigned to each fabric; the latter rating corresponding to the composition of the particular oil mixture which contained the highest percentage of heptane and which did not penetrate or wet the fabric.

| Oil repellency rating | Volume percent of mineral oil | Volume percent of heptane |
|---|---|---|
| 120 | 30 | 70 |
| 110 | 40 | 60 |
| 100 | 50 | 50 |
| 90 | 60 | 40 |
| 80 | 70 | 30 |
| 70 | 80 | 20 |
| 50 | 100 | 0 |
| 0 | (No resistance to mineral oil) | |

It is to be noted that ratings of 70 and above are indicative of effective oil repellency.

*Water repellency.*—The water repellency of the treated cotton fabrics was measured by use of the "Standard Spray Test" of the American Association of Textile Chemists and Colorists—AATCC No. 22–1964. In this procedure, the cotton samples which were used were prepared according to the method described, hereinabove, in the "Oil Repellency Test." The swatch was then securely fastened to a 6″ hoop so that it presented a smooth wrinkle-free surface. The test sample was positioned at a 45° angle with its mid-point directly opposite a spray nozzle so that the center of the spray pattern from the nozzle was, accordingly, aligned with the mid-point of the swatch. Thereupon, 250 ml. of distilled water were sprayed onto the sample over a period of 25 to 30 seconds. The wet pattern which formed on the surface of the test sample was compared with a series of rated standard wet patterns. Each test sample was then assigned the rating of the standard pattern which most closely approximated the pattern on the test sample. The standard patterns were rated according to the following scheme:

100—no sticking or wetting of upper surface
90—slight random sticking and wetting of upper surface
80—wetting of upper surface at spray points
70—partial wetting of whole of upper surface
50—complete wetting of whole of upper surface
0—complete wetting of whole of upper and lower surfaces.

The results of these determinations are presented in the following table:

TABLE

| Repellent (copolymer No.) | Percent of repellent based on weight of cotton fabric | Oil rating | Spray rating |
|---|---|---|---|
| Control (untreated cotton swatch) | | 0 | 0 |
| 21 | 0.1 | 70 | 50 |
| 21 | 0.4 | 80 | 80 |
| 21 | 0.8 | 90 | 80 |
| 21 | 1.6 | 100 | 90 |
| 22 | 0.8 | 80 | 50 |
| 23 | 0.8 | 80 | 50 |
| 24 | 0.8 | 90 | 50 |
| 25 | 0.8 | 90 | 50 |
| 26 | 0.8 | 100 | 50 |
| 27 | 0.8 | 90 | 50 |
| 28 | 0.8 | 70 | 50 |
| Copolymer prepared in Example II | 0.8 | 80 | 50 |

The results summarized above thus clearly show the excellent water and oil repellency exhibited by the novel fluoro acrylate polymers of this invention.

Summarizing, it is thus seen that this invention provides a novel class of fluoro acrylate and methacrylate esters which may be incorporated into a wide variety of copolymers; the resulting copolymers displaying excellent water, oil and soil repellency properties.

Variations may be made in proportions, procedures and materials without departing from the scope of this invention which is defined by the following claims.

What is claimed is:
1. A composition selected from the group consisting of fluoroalkyl amidoalkyl acrylate and methacrylate esters corresponding to the formula

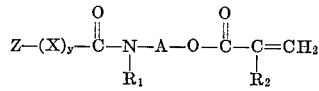

Z is a radical containing from 3 to 20 carbon atoms inclusive and is selected from the group consisting of straight and branched chain perfluoro alkyl radicals; perfluoro cyclo aliphatic radicals; perfluoro polycyclo aliphatic radicals; and straight and branched chain perfluoro alkyl, perfluoro cyclo aliphatic and perfluoro polycyclo aliphatic radicals wherein the perfluoro group is substituted with at least one atom selected from the group consisting of hydrogen, chlorine, bromine and iodine atoms;

X is a radical selected from the group consisting of straight chain alkylene radicals corresponding to the formula $(CH_2)_p$ wherein $p$ is an integer having a value of from 1 to 14 inclusive, hydrocarbon cycloaliphatic radicals, bridged hydrocarbon cycloaliphatic radicals; 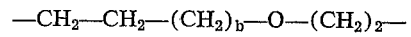 radicals wherein $b$ is an integer having a value of 0 to 14 inclusive.

$$-CH_2-CH_2-(CH_2)_b-O-(CH_2)_2-$$

radicals wherein $b$ is an integer having a value of from 0 to 14 inclusive,

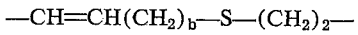

radicals wherein $b$ is an integer having a value of from 0 to 14 inclusive,

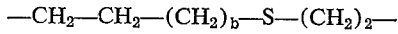

radicals wherein $b$ is an integer having a value of from 0 to 14 inclusive, and

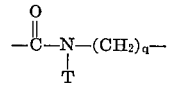

radicals wherein T is a radical selected from the group consisting of hydrogen radicals and alkyl radicals containing from 1 to 6 carbon atoms and $q$ is an integer having a value of from 1 to 18 inclusive;

$y$ is an integer having a value of from 0 to 1 inclusive;

A is a radical selected from the group consisting of straight and branched chain alkylene radicals corresponding to the formula $(CH_2)_m$ wherein $m$ is an integer having a value of from 2 to 14 inclusive, hydrocarbon cycloaliphatic radicals, bridged hydrocarbon cycloaliphatic radicals, ar-alkyl radicals and hydrocarbon aromatic radicals;

$R_1$ is a radical selected from the group consisting of hydrogen radicals and alkyl radicals containing from 1 to 6 carbon atoms; and $R_2$ is a radical selected from the group consisting of hydrogen and methyl radicals.

2. A composition exhibiting water and oil repellency properties comprising a polymer of at least one ethylenically unsaturated monomer together with at least one monomeric composition selected from the group consisting of fluoroalkyl amidoalkyl acrylate and methacrylate esters corresponding to the formula

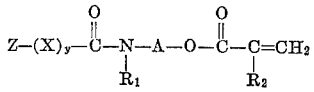

wherein:

Z is a radical containing from 3 to 20 carbon atoms inclusive and is selected from the group consisting of straight and branched chain perfluoro alkyl radicals; perfluoro cyclo aliphatic radicals; perfluoro polycyclo aliphatic radicals; and, straight and branched chain perfluoro alkyl, perfluoro cyclo aliphatic and perfluoro polycyclo aliphatic radicals wherein the perfluoro group is substituted with at least one atom selected from the group consisting of hydrogen, chlorine, bromine and iodine atoms;

X is a radical selected from the group consisting of straight chain alkylene radicals corresponding to the formula $(CH_2)_p$ wherein $p$ is an integer having a value of from 1 to 14 inclusive, hydrocarbon cycloaliphatic radicals, bridged hydrocarbon cycloaliphatic radicals; 
radicals wherein $b$ is an integer having a value of from 0 to 14 inclusive,

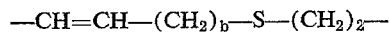

radicals wherein $b$ is an integer having a value of from 0 to 14 inclusive,

—CH=CH—(CH$_2$)$_b$—S—(CH$_2$)$_2$— radicals wherein 1 is an integer having a value of from 0 to 14 inclusive,

radicals wherein $b$ is an integer having a value of from 0 to 14 inclusive, and

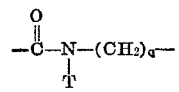

radicals wherein T is a radical selected from the group consisting of hydrogen radicals and alkyl radicals containing from 1 to 6 carbon atoms and $q$ is an integer having a value of from 1 to 18 inclusive;

$y$ is an integer having a value of from 0 to 1 inclusive;

A is a radical selected from the group consisting of straight and branched chain alkylene radicals corresponding to the formula $(CH_2)_m$ wherein $m$ is an integer having a value of from 2 to 14 inclusive, hydrocarbon cycloaliphatic radicals, bridged hydrocarbon cycloaliphatic radicals, ar-alkyl radicals and hydrogen aromatic radicals;

$R_1$ is a radical selected from the group consisting of hydrogen radicals and alkyl radicals containing from 1 to 6 carbon atoms; and, $R_2$ is a radical selected from the group consisting of hydrogen and methyl radicals.

3. The composition of claim 2, wherein said ethylenically unsaturated monomer is selected from the group consisting of styrene, alpha-methyl styrene, the acrylic, methacrylic and crotonic esters of aliphatic alcohols, acrylic acid, methacrylic acid, crotonic acid, isoprene, acrylamide, methacrylamide, N-methylol acrylamide, acrylonitrile, methacrylonitrile, butadiene, vinyl propionate, dibutyl fumarate, dibutyl maleate, diallyl phthalate, vinylidene chloride, vinyl chloride, vinyl fluoride, vinyl acetate, ethylene and propylene.

4. A process for preparing polymers which are capable of imparting water and oil repellency to solid substrates, said process comprising the step of heating at least one ethylenically unsaturated monomer, in the presence of a free radical initiator, together with at least one monomeric composition selected from the group consisting of fluoroalkyl amidoalkyl acrylate and methacrylate esters corresponding to the formula

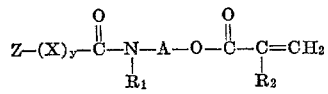

wherein:

Z is a radical containing from 3 to 20 carbon atoms inclusive and is selected from the group consisting of straight and branched chain perfluoro alkyl radicals; perfluoro cyclo aliphatic radicals; perfluoro polycyclo aliphatic radicals; and, straight and branched chain perfluoro alkyl, perfluoro cyclo aliphatic and perfluoro polycyclo alpihatic radicals wherein the perfluoro group is substituted with at least one atom selected from the group consisting of hydrogen, chlorine, bromine and iodine atoms;

X is a radical selected from the group consisting of straight chain alkylene radicals corresponding to the formula $(CH_2)_p$ wherein $p$ is an integer having a valve of from 1 to 14 inclusive, cycloaliphatic radicals, bridged cycloaliphatic radicals;

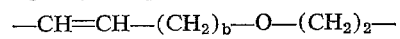

radicals wherein $b$ is an integer having a value of from 0 to 14 inclusive;

radicals wherein $b$ is an integer having a value of from 0 to 14 inclusive,

—CH=CH—(CH$_2$)$_b$—S—(CH$_2$)$_2$— radicals wherein $b$ is an integer having a value of from 0 to 14 inclusive,

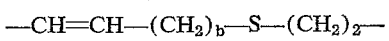

radicals wherein $b$ is an integer having a value of from 0 to 14 inclusive, and

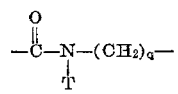

radicals wherein T is a radical selected from the group consisting of hydrogen radicals and alkyl radicals containing from 1 to 6 carbon atoms and $q$ is an integer having a value of from 1 to 18 inclusive;

$y$ is an integer having a value of from 0 to 1 inclusive;

A is a radical selected from the group consisting of straight and branched chain alkylene radicals corresponding to the formula $(CH_2)_m$ wherein $m$ is an integer having a value of from 2 to 14 inclusive, cycloaliphatic radicals, bridged cycloaliphatic radicals, ar-alkyl radicals and aromatic radicals;

$R_1$ is radical selected from the group consisting of hydrogen radicals and alkyl radicals containing from 1 to 6 carbon atoms; and, $R_2$ is a radical selected from the group consisting of hydrogen and methyl radicals.

5. The process of claim 4, wherein said ethylenically unsaturated monomer is selected from the group consisting of styrene, alpha-methyl styrene, the acrylic, methacrylic and crotonic esters of aliphatic alcohols, acrylic acid, methacrylic acid, crotonic acid, isoprene, arylamide, methacrylamide, N-methylol acrylamide, acrylonitrile, methacrylonitrile, butadiene, vinyl propionate, dibutyl fumarate, dibutyl maleate, diallyl phthalate, vinylidene chloride, vinyl chloride, vinyl fluoride, vinyl acetate, ethylene and propylene.

6. A solid substrate exhibiting water and oil repellency to which has been applied on at least one surface thereof a polymer of at least one ethylenically unsaturated monomer together with at least one monomeric composition selected from the group consisting of fluoroalkyl amidoalkyl arcylate and methacrylate esters corresponding to the formula

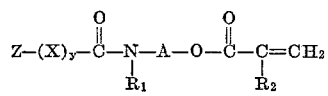

wherein:

Z is a radical containing from 3 to 20 carbon atoms inclusive and is selected from the group consisting of straight and branched chain perfluoro alkyl radicals; perfluoro cyclo aliphatic radicals; perfluoro polycyclo aliphatic radicals; and straight and branched chain perfluoro alkyl, perfluoro cyclo aliphatic and perfluoro polycyclo aliphatic radicals wherein the perfluoro group is substituted with at least one atom selected from the group consisting of hydrogen, chlorine, bromine and iodine atoms;

X is a radical selected from the group consisting of straight chain alkylene radicals corresponding to the formula $(CH_2)_p$ wherein $p$ is an integer having a value of from 1 to 14 inclusive, cycloaliphatic radicals, bridged cycloaliphatic radicals;

$$—CH=CH—(CH_2)_b—O—(CH_2)_2—$$

radicals wherein $b$ is an integer having a value of from 0 to 14 inclusive, $$—CH_2—CH_2—(CH_2)_b—O—(CH_2)_2—$$

radicals wherein $b$ is an integer having a value of from 0 to 14 inclusive, $$—CH=CH—(CH_2)_b—S—(CH_2)_2—$$

radicals wherein $b$ is an integer having a value of from 0 to 14 inclusive, $$—CH_2—CH_2—(CH_2)_b—S—(CH_2)_2—$$

radicals wherein $b$ is an integer having a value of from 0 to 14 inclusive, and

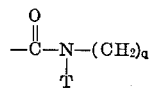

radicals wherein T is a radical selected from the group consisting of hydrogen radicals and alkyl radicals containing from 1 to 6 carbon atoms and $q$ is an integer having a value of from 1 to 18 inclusive;

$y$ is an integer having a value of from 0 to 1 inclusive;

A is a radical selected from the group consisting of straight and branched chain alkylene radicals corresponding to the formula $(CH_2)_m$ wherein $m$ is an integer having a value of from 2 to 14 inclusive, cycloaliphatic radicals, bridged cycloaliphatic radicals, ar-alkyl radicals and aromatic radicals;

$R_1$ is radical selected from the group consisting of hydrogen radicals and alkyl radicals containing from 1 to 6 carbon atoms; and $R_2$ is a radical selected from the group consisting of hydrogen and methyl radicals.

7. The solid substrate of claim 6, wherein said ethylenically unsaturated monomer is selected from the group consisting of styrene, alpha-methyl styrene, the acrylic, methacrylic and crotonic esters of aliphatic alcohols, acrylic acid, methacrylic acid, crotonic acid, isoprene, acrylamide, methacrylamide, N-methylol acrylamide, acrylonitrile, methacrylonitrile, butadiene, vinyl propionate, dibutyl fumarate, dibutyl maleate, diallyl phthalate, vinylidene chloride, vinyl chloride, vinyl fluoride, vinyl acetate, ethylene and propylene.

8. The solid substrate of claim 6 to which has been applied at least 0.1% of said polymer, based on the weight of said substrate.

9. A process for imparting water and oil repellency to solid substrates which comprises applying to said substrate an organic solvent solution of a polymer of at least one ethylenically unsaturated monomer together with at least one monomeric composition selected from the group consisting of fluoroalkyl amidoalkyl acrylate and methacrylate esters corresponding to the formula

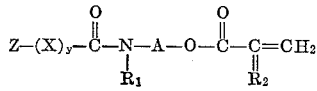

wherein:

Z is a radical containing from 3 to 20 carbon atoms inclusive and is selected from the group consisting of straight and branched chain perfluoro alkyl radicals; perfluoro cyclo aliphatic radicals; perfluoro polycyclo aliphatic radicals; and, straight and branched chain perfluoro alkyl, perfluoro cyclo aliphatic and perfluoro polycyclo aliphatic radicals wherein the perfluoro group is substituted with at least one atom selected from the group consisting of hydrogen, chlorine, bromine and iodine atoms;

X is a radical selected from the group consisting of straight chain alkylene radicals corresponding to the formula $(CH_2)_p$ wherein $p$ is an integer having a value of from 1 to 14 inclusive, cycloaliphatic radicals, bridged cycloaliphatic radicals;

$$—CH=CH—(CH_2)_b—O—(CH_2)_2—$$

radicals wherein $b$ is an integer having a value of from 0 to 14 inclusive, $$—CH_2—CH_2—(CH_2)_b—O—(CH_2)_2—$$

radicals wherein $b$ is an integer having a value of from 0 to 14 inclusive, $$—CH=CH—(CH_2)_b—S—(CH_2)_2—$$

radicals wherein $b$ is an integer having a value of from 0 to 14 inclusive, $$—CH_2—CH_2—(CH_2)_b—S—(CH_2)_2—$$

radicals wherein $b$ is an integer having a value of from 0 to 14 inclusive, and

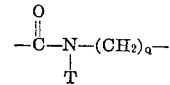

radicals wherein T is a radical selected from the group consisting of hydrogen radicals and alkyl radicals containing from 1 to 6 carbon atoms and $q$ is an integer having a value of from 1 to 18 inclusive;

$y$ is an integer having a value of from 0 to 1 inclusive;

A is a radical selected from the group consisting of straight and branched chain alkylene radicals corresponding to the formula $(CH_2)_m$ wherein $m$ is an integer having a value of from 2 to 14 inclusive, cycloaliphatic radicals, bridged cycloaliphatic radicals;

$R_1$ is a radical selected from the group consisting of hydrogen radicals and alkyl radicals containing from 1 to 6 carbon atoms; and, $R_2$ is a radical selected from the group consisting of hydrogen and methyl radicals;

removing said organic solvent; and, heating said treated solid substrate at a temperature of from about 60 to 180° C. for a period of from about 5 to 10 minutes.

10. The process of claim 9, wherein said ethylenically unsaturated monomer is selected from the group consisting of styrene, alpha-methyl styrene, the acrylic methacrylic and crotonic esters of aliphatic alcohols, acrylic acid, methacrylic acid, crotonic acid, isoprene, acrylamide, methacrylamide, N-methylol acrylamide, acryonitrile, methacrylonitrile, butadiene, vinyl propionate, dibutyl fumarate, dibutyl maleate, diallyl phthalate, vinylidene chloride, vinyl chloride, vinyl fluoride, vinyl acetate, ethylene and propylene.

11. The process of claim 9 in which at least 0.1% of said polymer, based on the weight of the substrate, is applied to said substrate.

12. A composition exhibiting water and oil repellency properties comprising a homopolymer of a monomeric composition selected from the group consisting of fluoroalkyl amidoalkyl acrylate and methacrylate esters corresponding to the formula

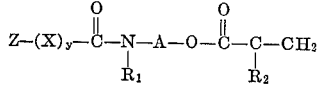

wherein:

Z is a radical containing from 3 to 20 carbon atoms inclusive and is selected from the group consisting of straight and branched chain perfluoro alkyl radicals; perfluoro cyclo aliphatic radicals; perfluoro polycyclo aliphatic radicals; and, straight and branched chain perfluoro alkyl, perfluoro cyclo aliphatic and perfluoro polycyclo aliphatic radicals wherein the perfluoro group is substituted with at least one atom selected from the group consisting of hydrogen, chlorine, bromine and iodine atoms;

X is a radical selected from the group consisting of straight chain alkylene radicals corresponding to the formula $(CH_2)_p$ wherein $p$ is an integer having a value of from 1 to 14 inclusive, hydrocarbon cycloaliphatic radicals, bridged hydrocarbon cycloaliphatic radicals;

radicals wherein $b$ is an integer having a value of from 0 to 14 inclusive,

radicals wherein $b$ is an integer having a value of from 0 to 14 inclusive,

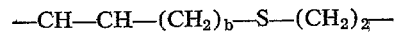

radicals wherein $b$ is an integer having a value of from 0 to 14 inclusive,

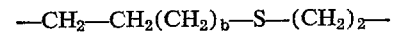

radicals wherein $b$ is an integer having a value of from 0 to 14 inclusive, and

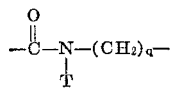

radicals wherein T is a radical selected from the group consisting of hydrogen radicals and alkyl radicals containing from 1 to 6 carbon atoms and $q$ is an integer having a value of from 1 to 18 inclusive;

$y$ is an integer having a value of from 0 to 1 inclusive;

A is a radical selected from the group consisting of straight and branched chain alkylene radicals corresponding to the formula $(CH_2)_m$ wherein $m$ is an integer having a value of from 2 to 14 inclusive, hydrocarbon cycloaliphatic radicals, bridged hydrocarbon cycloaliphatic radicals; ar-alkyl radicals and hydrocarbon aromatic radicals;

$R_1$ is a radical selected from the group consisting of hydrogen radicals and alkyl radicals containing from 1 to 6 carbon atoms; and $R_2$ is a radical selected from the group consisting of hydrogen and methyl radicals.

References Cited

UNITED STATES PATENTS 3,393,186  7/1968  Groves _____ 260—89.5
3,412,142  11/1968  Pacini _____ 260—500.5

JOSEPH L. SCHOFER, Primary Examiner

J. KIGHT III, Assistant Examiner

U.S. Cl. X.R.

117—124, 127, 126, 138.8, 140, 142, 145, 148, 155, 161; 252—8.57, 88; 260—29.1, 32.8, 33.4, 80.81, 80.73, 80.3, 83.5, 85.7, 86.1, 87.5, 87.7, 88.1, 89.5, 487